(12) United States Patent
Wellbrock et al.

(10) Patent No.: US 9,391,732 B2
(45) Date of Patent: *Jul. 12, 2016

(54) OPTICAL TRANSPORT HAVING FULL AND FLEXIBLE BANDWIDTH AND CHANNEL UTILIZATION

(71) Applicant: Verizon Patent and Licensing Inc., Basking Ridge, NJ (US)

(72) Inventors: Glenn A. Wellbrock, Wylie, TX (US); Tiejun J. Xia, Richardson, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/171,039

(22) Filed: Feb. 3, 2014

(65) Prior Publication Data

US 2015/0288478 A1    Oct. 8, 2015

Related U.S. Application Data

(63) Continuation of application No. 13/160,717, filed on Jun. 15, 2011, now Pat. No. 8,644,710.

(51) Int. Cl.
*H04B 10/27* (2013.01)
*H04J 14/02* (2006.01)
*H04Q 11/00* (2006.01)

(52) U.S. Cl.
CPC .............. *H04J 14/021* (2013.01); *H04B 10/27* (2013.01); *H04J 14/0212* (2013.01); *H04J 14/0217* (2013.01); *H04J 14/0227* (2013.01); *H04Q 11/0062* (2013.01); *H04Q 2011/0064* (2013.01)

(58) Field of Classification Search
CPC ..... H04B 10/27; H04J 14/021; H04J 14/0227
See application file for complete search history.

(56) References Cited

U.S. PATENT DOCUMENTS

| | | | | |
|---|---|---|---|---|
| 8,644,710 | B2* | 2/2014 | Wellbrock | H04J 14/021 398/50 |
| 2008/0193133 | A1* | 8/2008 | Krug | G02B 6/12007 398/83 |
| 2011/0164876 | A1* | 7/2011 | Fujita | H04J 14/021 398/48 |
| 2011/0262142 | A1* | 10/2011 | Archambault | H04J 14/02 398/83 |
| 2011/0262143 | A1* | 10/2011 | Ji | H04J 14/0204 398/83 |
| 2012/0002964 | A1* | 1/2012 | Takatsu | H04J 14/0204 398/50 |
| 2012/0027408 | A1* | 2/2012 | Atlas | H04J 14/0204 398/58 |

\* cited by examiner

*Primary Examiner* — Dalzid Singh

(57) ABSTRACT

Optical nodes in an optical network may provide directionless, colorless, contentionless, and gridless transmission, reception, and switching of optical signals in which a non-fixed number of optical channels and a non-fixed bandwidth for each optical channel is used. Optical nodes can use the full extent of the optical bandwidth due to the absence of channel spacing.

20 Claims, 9 Drawing Sheets

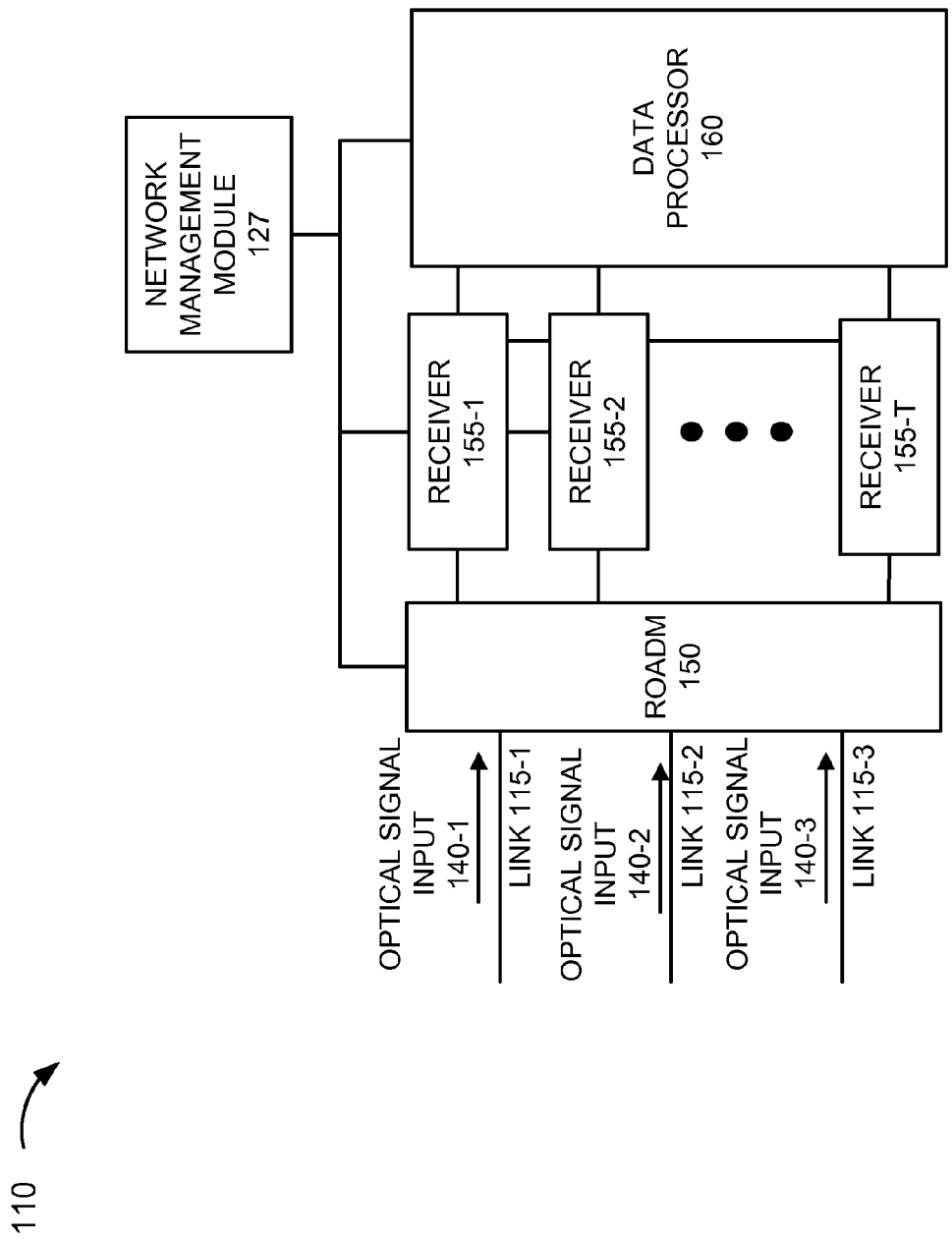

OPTICAL TRANSPORT HAVING FULL AND FLEXIBLE BANDWIDTH AND CHANNEL UTILIZATION

CROSS REFERENCE TO RELATED APPLICATIONS

This application is a continuation of U.S. patent application Ser. No. 13/160,717 filed on Jun. 15, 2011, the disclosure of which is incorporated herein by reference in its entirety.

BACKGROUND

In an optical network, Dense Wavelength Division Multiplexing (DWDM) permits the multiplexing of multiple optical carriers onto a single optical fiber by using different wavelengths of laser light. DWDM can carry more optical channels compared to, for example, Coarse Wavelength Division Multiplexing (CWDM). As a result, DWDM is used in optical networks in which denser optical channel spacing is needed.

According to DWDM, each transport channel has only one optical carrier that occupies a fixed optical bandwidth. Since the total usable optical bandwidth of an optical fiber is fixed, a DWDM system has a fixed number of total optical channels. For example, the total usable bandwidth of an optical fiber may be about 5-10 THz. In this instance, a DWDM system can have a fixed number of optical channels, such as a 96-channel system or a 128-channel system. The fixed optical bandwidth also includes bandwidth to separate adjacent optical channels, which is known as channel spacing. For example, 10-Gb/s optical systems may have a channel spacing of 100 GHz or a channel spacing of 50 GHz. Additionally, according to the DWDM system, a central frequency of an optical channel is anchored to a frequency grid defined by a standard body, such as the International Telecommunication Union (ITU).

BRIEF DESCRIPTION OF THE DRAWINGS

FIG. 1C is a diagram illustrating components of an exemplary embodiment of a receiving-side of the optical node depicted in FIG. 1A;

DETAILED DESCRIPTION OF PREFERRED EMBODIMENTS

Figure 1A:
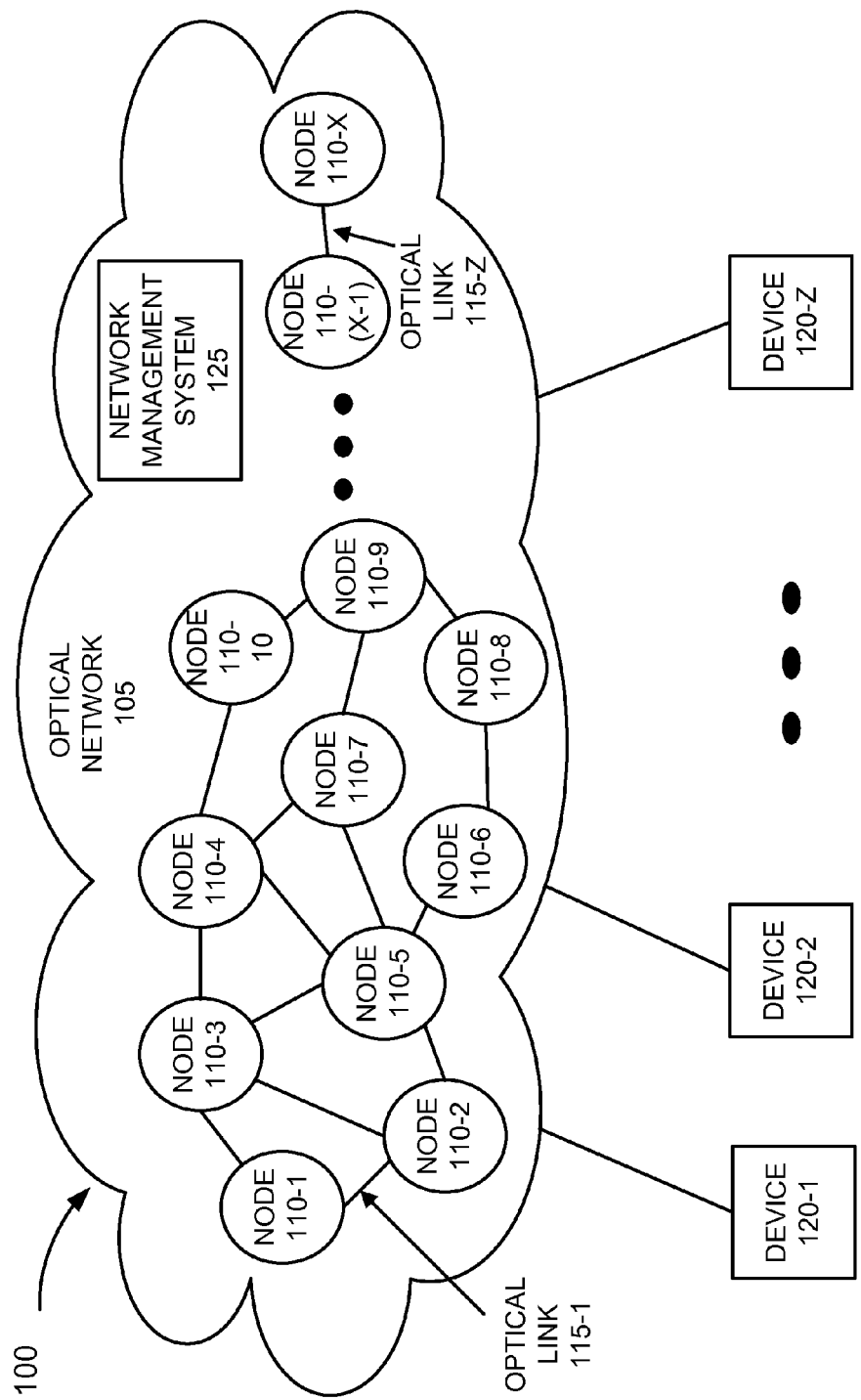
FIG. 1A is a diagram illustrating an exemplary embodiment of an optical network in which an optical transport system having full and flexible bandwidth and channel utilization may be implemented.

The following detailed description refers to the accompanying drawings. The same reference numbers in different drawings may identify the same or similar elements. Also, the following detailed description does not limit the invention.

According to an exemplary embodiment, the transport system of an optical network permits bandwidth of a transport channel to be dynamically set depending on the particular light-path and network traffic demands. According to an exemplary embodiment, the central frequency of the transport channel need not be anchored to a fixed optical frequency grid (e.g., gridless). In this regard, the transport system will not have a fixed total number of transport channels nor a fixed total number of optical carriers. By way of example, according to a fixed-grid design, a 1 Terabit/second (Tb/s) system can use 500 Gigahertz (GHz) of optical bandwidth since optical carrier spacing is fixed at 50 GHz. In contrast, according to a gridless design, a 1 Tb/s system may only use 320 GHz of bandwidth when no channel spacing is used and when the modulation format for each optical carrier is 32 Gigabaud (GBaud). In addition, according to an exemplary embodiment, the transport system of an optical network may use the unused portion of optical spectrum (e.g., 180 GHz of bandwidth, according to the above-mentioned example) to support additional optical channels.

According to an exemplary embodiment, the transport system may include optical nodes that are able to switch any transport channel regardless of its bandwidth and central frequency. According to an exemplary embodiment, an optical node may include an add/drop multiplexer, such as a Reconfigurable Optical Add-Drop Multiplexer (ROADM), that is able to switch any transport channel regardless of its starting frequency, ending frequency and central frequency. According to an exemplary implementation, the ROADM may have a colorless, directionless, contentionless, and gridless architecture. The ROADM may switch optical channels for which channel spacing is not used. As a result, the additional bandwidth resulting from the absence of guard bands may be used for additional optical channels, as described further below.

According to an exemplary embodiment, an optical node may include a transponder or a transceiver that is able to set various parameters according to the network traffic demand in a light path. The parameters may include the data rate of each optical channel, the number of optical carriers to be used in each optical channel, the modulation format of each optical channel, the total bandwidth of each optical channel, and the starting and ending frequencies of each optical channel. The transponder may include a single-carrier transmitter and/or a multi-carrier transmitter with tunable optical carrier so that a transport channel may be carried by a single carrier or multiple carriers (e.g., a super channel). Additionally, the transponder may include a single-carrier receiver or a multi-carrier receiver and a transport re-assembler for receiving a transport channel carried by the single carrier or multiple carriers.

According to an exemplary embodiment, an optical node may include a network management system. The network management system may configure an optical node in accordance with the features described herein. For example, the network management system may configure the optical node as it pertains to optical channel configuration (e.g., bandwidth assigned to the transport channel, the number of optical carriers, the modulation format, the data rate, the starting and ending frequency of the optical channel, etc.), power configuration, etc.

According to an exemplary embodiment, the optical network may include a network management system that manages the configuration of the optical network including the optical nodes. The network management system may identify network state information, resource availability and/or allocation, and other parameters pertaining to the optical network. The network management system may communicate with the network management system of an optical node regarding these parameters as such parameters relate to the features described herein. The optical network may optimize channel capacity, total capacity, spectral efficiency, reach distance, etc.

FIG. 1A is a diagram illustrating an exemplary embodiment of an optical network in which an optical transport system having full and flexible bandwidth and channel utilization may be implemented. As illustrated in FIG. 1A, an exemplary environment 100 includes an optical network 105 including optical node 110-1 through optical node 110-X, in which X>1 (referred to individually as optical node 110 or collectively as optical nodes 110), optical link 115-1 through optical link 115-Z, in which Z>1 (referred to individually as optical link 115 or collectively as optical links 115), and network management system 125. Environment 100 also includes device 120-1 through device 120-Z, in which Z>1 (referred to individually as device 120 or collectively as devices 120). Devices 120 may be communicatively coupled to optical network 105 via various access technologies.

The number of devices (which includes optical nodes) and the configuration in environment 100 are exemplary and provided for simplicity. According to other embodiments, environment 100 may include additional devices, fewer devices, different devices, and/or differently arranged devices than those illustrated in FIG. 1A. For example, environment 100 may include intermediary devices (not illustrated) to permit communication between devices 120 and optical network 105.

Optical network 105 is an optical network. For example, optical network 105 may include a synchronous optical network. Optical network 105 may be implemented using various topologies (e.g., mesh, ring, etc.). According to an exemplary embodiment, optical network 105 is a long-haul optical network (e.g., long-haul, extended long-haul, ultra long-haul). According to other embodiments, optical network 105 is an optical network other than a long-haul optical network. Optical node 110 is a point in optical network 105. For example, optical node 110 may be an optical regeneration node, an optical transmitting/receiving node, or an optical switching node. Optical node 110 may be implemented as a DWDM system. Optical link 115 is an optical fiber (e.g., nonzero dispersion-shifted fiber, etc.) that communicatively couples optical node 110 to another optical node 110.

Device 120 may include a device having the capability to communicate with a network (e.g., optical network 105), devices and/or systems. For example, device 120 may correspond to a user device. For example, the user device may take the form of a portable device, a handheld device, a mobile device, a stationary device, a vehicle-based device, or some other type of user device. Additionally, or alternatively, device 120 may correspond to a non-user device, such as, a meter, a sensor, or some other device that is capable of machine-to-machine (M2M) communication.

Network management system 125 may manage the configuration of optical network 105 including the optical nodes 110. Network management system 125 may permit administrators to monitor, configure, etc., optical network 105. Network management system 125 may be capable of identifying network state information, resource availability and resource allocation, and/or other parameters pertaining to optical network 105. Network management system 125 may communicate with a network management system (not illustrated) of an optical node 110 regarding these parameters as such parameters relate to the features described herein. For example, network management system 125 may assign bandwidth to a transport channel based on the bandwidth needed, the distance to reach (e.g., based on a distance between source and destination optical nodes 110), the time the bandwidth is needed, optimization of spectral usage, as well as other parameters described. Network management system 125 may include one or more network devices (e.g., a server, a computer, etc.). Network management system 125 may be implemented in a centralized or a distributed fashion.

Figure 1B:
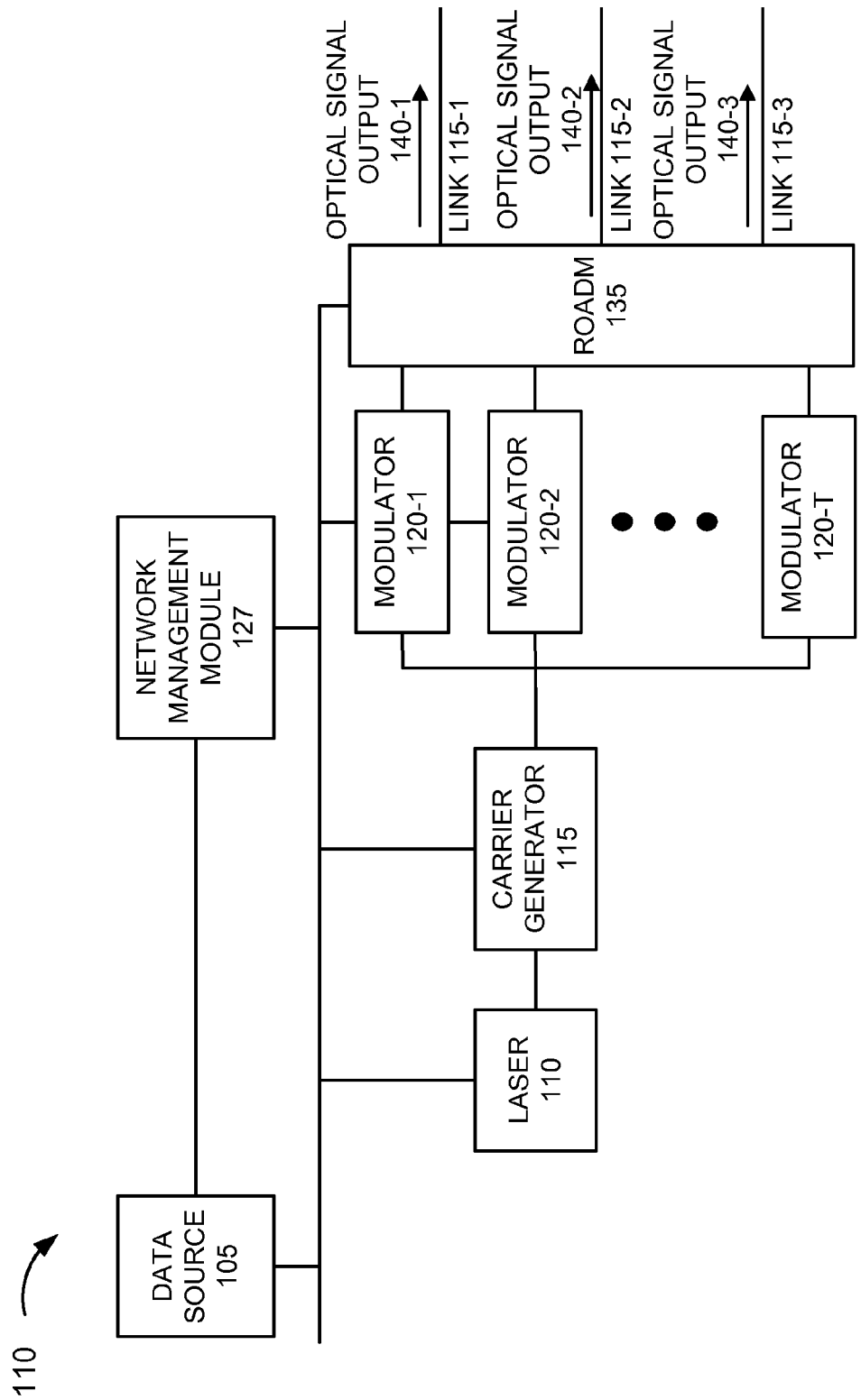
FIG. 1B is a diagram illustrating components of an exemplary embodiment of a transmitting-side of an optical node depicted in FIG. 1A.

FIG. 1B is a diagram illustrating components of an exemplary embodiment of a transmitting-side of one or more of the optical nodes 110 depicted in FIG. 1A. As previously described, the transport system, among other things, may not use channel spacing. As a result, the additional bandwidth resulting from the absence of guard bands (i.e., channel spacing) may be used for additional optical channels. However, optical nodes in existing DWDM systems and WDM systems are configured both in terms of operation and available node resources (e.g., number of transmitters, receivers, transponders, switches, ports, etc.) according to a fixed system (e.g., in terms of central frequency, number of optical channels, etc.), as previously described. According to an exemplary embodiment, optical node 110 illustrated in FIG. 1B may be configured both in terms of operation and available node resources for full and flexible bandwidth and channel utilization.

According to another exemplary embodiment, not illustrated, a legacy optical node may be expanded in terms of node resources (e.g., adding transponders, ports, switches, line amplifiers, etc.) and updated in terms of operation to make use of the various features described herein. For example, an optical node of a fixed-channel system (e.g., a 40-channel transport system, an 80-channel transport system, a 96-channel transport system, etc.) has a particular number of transponders, ports, switches, line amplifiers, etc., to support the fixed-channel system. However, as described herein, by using, among other things, a gridless transport system in which channel spacing is not used, the available bandwidth (e.g., C-band, L-band, S-band, etc.) is increased. Therefore, in terms of a legacy optical node, the number of node resources could be expanded (i.e., increased in number relative to a fixed-channel optical node) to accommodate the additional available bandwidth.

As illustrated in FIG. 1B, optical node 110 includes a data source 105, a laser 110, a carrier generator 115, modulators 120-1 through 120-T, in which T>1 (referred to individually as modulator 120 or collectively as modulators 120), a network management module 127, and a ROADM 135. As further illustrated, optical links 115-1 through 115-3 are coupled to ROADM 135. The number of optical links 115 is exemplary and provided for simplicity.

The number of components and the configuration (e.g., connection between components) are exemplary and provided for simplicity. According to other embodiments, optical node 110 may include additional components, fewer components, different components, and/or differently arranged components than those illustrated in FIG. 1B. For example, the transmitting-side of optical node 110 may include a power source, an optical amplifier (e.g., Erbium Doped Fiber Amplifier (EDFA), Raman amplifier, etc.), digital signal processing (DSP) (e.g., forward error correction (FEC), equalization, filtering, etc), an optical transceiver, etc. Additionally, for example, the transmitting-side of optical node 110 may not include carrier generator 115 and multiple lasers 110 may be used.

Data source 105 may provide data that is to traverse optical node(s) 110 in optical network 105. Laser 110 may include a laser (e.g., a cooled laser). According to an exemplary embodiment, laser 110 may include a tunable laser (e.g., a Distributed Feedback (DFB) laser, an External-Cavity Laser (ECL), a Sampled Grating Distributed Bragg Reflector (SGDBR) laser, etc.). Carrier generator 115 may include components (e.g., a Photonic Integrated Circuit (PIC) or other known multicarrier generating architectures) to produce a single carrier optical channel and/or a multicarrier optical channel, such as a super-channel.

Modulators 120 may include optical modulators to provide a modulation format in terms of constellation (e.g., binary, quaternary, 8-ary, 16-ary, higher order constellations, etc.), manner of modulation (e.g. intensity, phase, frequency, polarization), etc.

Network management module 127 may include logic to manage transport channels and signaling. For example, network management module 127 may select bandwidths for optical channels (i.e., starting frequencies and ending frequencies) without being anchored to a fixed optical frequency grid, optimize channel capacity, total capacity, spectral efficiency, reach distance, etc. Network management module 127 may identify whether an optical channel is single-carrier or multi-carrier, the type of modulation for each optical carrier, and the data rate. Network management module 127 may also correlate performance and alarm information across all optical carriers.

Network management module 127 may include one or multiple processors, microprocessors, multi-core processors, application specific integrated circuits (ASICs), controllers, microcontrollers, and/or some other type of hardware logic to perform the processes or functions described herein. Network management module 127 may configure the operation of optical node 110 based on information received from network management system 125 and/or optical network requirements (e.g., network traffic demands, resources available, etc.).

ROADM 135 is an add/drop multiplexer. ROADM 135 may include a colorless (e.g., any wavelength to any add/drop port), a directionless (e.g., any wavelength to any degree), a contentionless (e.g., any combination of wavelengths to any degree from any port), and a gridless (e.g. no fixed frequency) architecture. ROADM 135 may support any portion of the optical spectrum provided by the optical network, any channel bit rate, and/or any modulation format. ROADM 135 is described further below.

According to an exemplary process, as illustrated in FIG. 1B, the transmitting-side of optical node 110 may output optical signals (e.g., optical signal outputs 140-1 through 140-3) to optical links 115, which may traverse light paths in optical network 105. The number of output optical signals is exemplary and provided for simplicity.

FIG. 1C is a diagram illustrating components of an exemplary embodiment of a receiving-side of one or more of the optical nodes 110 depicted in FIG. 1A. According to an exemplary embodiment, optical node 110 illustrated in FIG. 1C may be configured both in terms of operation and available node resources for full and flexible bandwidth and channel utilization. According to another exemplary embodiment, not illustrated, a legacy optical node may be expanded in terms of node resources (e.g., adding transmitters, receivers, ports, transponders, switches, etc.) and updated in terms of operation to make use of the various features described herein.

As illustrated, optical node 110 includes network management module 127, a ROADM 150, receivers 155-1 through 155-T, in which T>1 (referred to individually as receiver 155 or collectively as receivers 155), and a data processor 160. As further illustrated, optical links 115-1 through 115-3 are coupled to ROADM 150.

The number of components and the configuration (e.g., connection between components) are exemplary and provided for simplicity. According to other embodiments, optical node 110 may include additional components, fewer components, different components, and/or differently arranged components than those illustrated in FIG. 1C. For example, optical node 110 may include a power source, an optical amplifier (e.g., EDFA, Raman amplifier, etc.), DSP, a transceiver, etc.

Network management module 127 may include logic to manage transport channels and signaling, as previously described. Network management module 127 may correlate multi-carriers to a transport channel, such as with a super-channel. Network management module 127 may also manage failures pertaining to a transport channel. For example, network management module 127 may identify when an optical carrier(s) may need to be re-transmitted (e.g., due to the failure) by a source or a transmitting optical node 110.

ROADM 150 may include a ROADM similar to that described above (i.e., ROADM 135). Receivers 155 may include optical receivers or transponders. Data processor 160 may include logic to convert optical signals 140 to construct frames, packets, or other type of data containers.

Figure 1D:
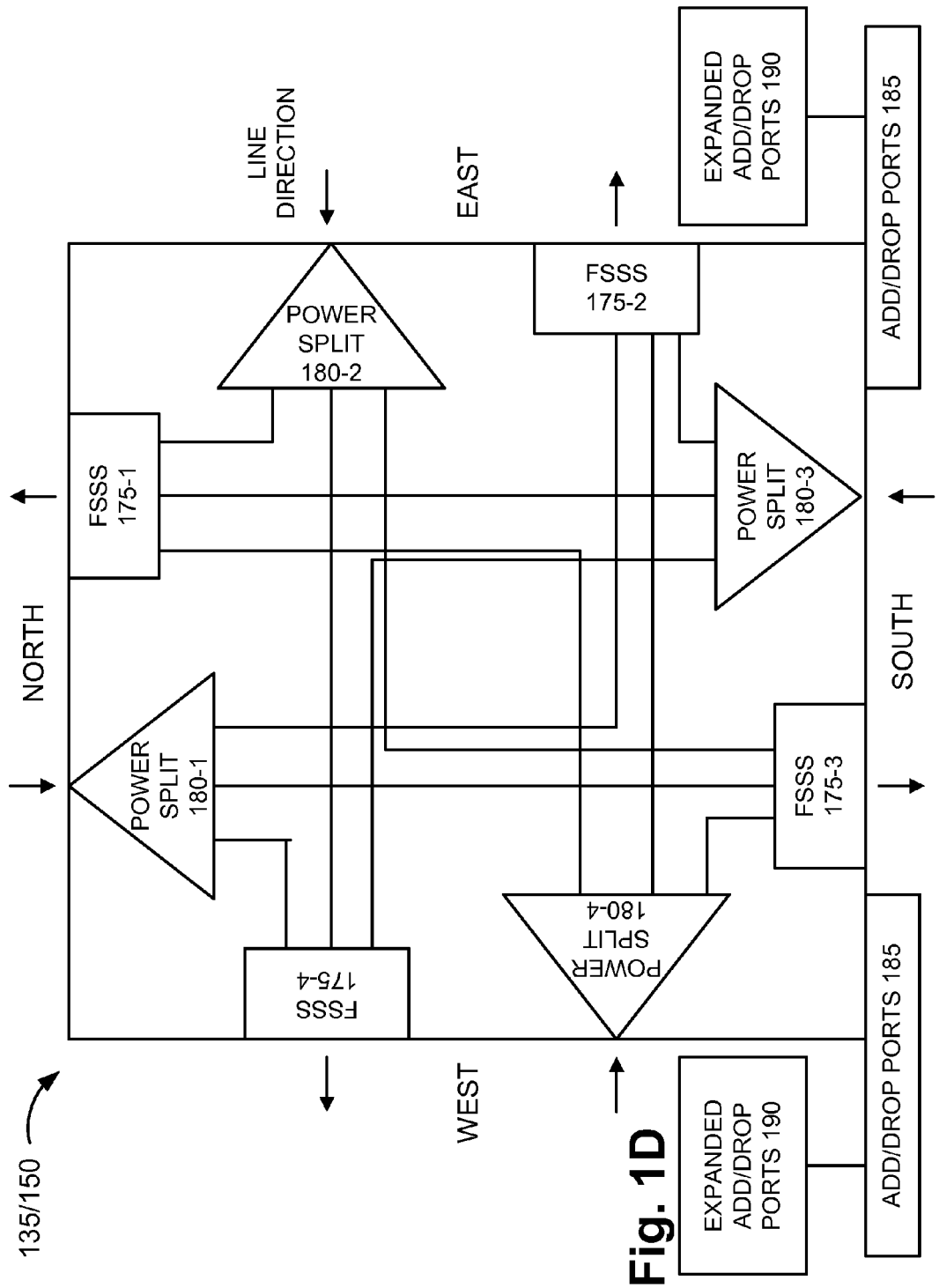
FIG. 1D is a diagram illustrating an exemplary embodiment of an add-drop multiplexer that may be included in an optical node.

FIG. 1D is a diagram illustrating an exemplary embodiment of an add-drop multiplexer, such as ROADM 135/150 that may be included in one or more of optical nodes 110. As illustrated, ROADM 135/150 may include, among other components, flexible spectrum selective switches (FSSSs) 175-1 through 175-4 (referred to individually as FSSS 175 or collectively as FSSSs 175, power splitters 180-1 through 180-4 (referred to individually as power splitter 180 or power splitters 180), and add/drop ports 185. According to other embodiments, ROADM 135/150 may have a different degree (i.e., other than a 4-degree ROADM).

The number of components and the configuration (e.g., connection between components) are exemplary and provided for simplicity. According to other embodiments, ROADM 135/150 may include additional components, fewer components, different components, and/or differently arranged components than those illustrated in FIG. 1D. For example, ROADM 135/150 may include a channel monitor and/or an error detector. Additionally, the number of components (e.g., add/drop ports 185, etc.) may be vary depending on the non-fixed transport system. According to an exemplary implementation, ROADM 135/150 may take the form of a ROADM blade. According to an exemplary embodiment, ROADM 135/150 is colorless, directionless, contentionless, and gridless.

FSSS 175 may include a spectrum selective switch that, among other things, uses the available bandwidth due to the absence of channel spacing for full and flexible channel utilization. FSSS 175 may also have grid-free capability. FSSS 175 may be able to switch any optical channel regardless of its bandwidth and central frequency. FSSS 175 may also accommodate other features pertaining to the transport system described herein. In this regard, FSSS 175 is distinguishable from a Wavelength Selective Switch (WSS) that is used in a conventional ROADM.

Power splitter 180 may include an optical power splitter and/or an optical power combiner that is/are color-agnostic, directionless, and contentionless. Power splitter 180 may provide for splitting and/or combining of optical signals in optical fibers. Add/drop ports 185 are ports for adding and dropping optical signals. Expanded add/drop ports 190 are ports for adding and dropping optical signals. For example, ROADM 135/150 may include expanded add/drop ports 190 when ROADM 135/150 is upgraded from a fixed-channel transport system to a non-fixed channel transport system. Although not illustrated, other components of ROADM 135/150 may be expanded. According to another example, when ROADM 135/150 is not upgraded (e.g., from a fixed-channel transport system), ROADM 135/150 may not include expanded add/drop ports 190.

Referring to FIG. 1D, assume that there is no spectral barrier between optical channels and that the total spectral width of the transport system is 6 Terahertz (THz). In comparison to a fixed 120-channel system, in which each optical channel occupies 50 GHz of optical bandwidth, in this example, each optical channel may occupy only 32 GHz of optical bandwidth because there is no channel spacing. As a result, the 120 channels may be packed into approximately 3.84 THz of optical spectrum instead of 6 THz (e.g., assuming a 32 GBaud symbol rate for each optical channel). In view of the remaining available optical bandwidth, 67 additional optical channels may be packed into the remaining spectral bandwidth, which translates into an increase of 56%, relative to a fixed-frequency 120-channel system.

ROADM 135/150 (e.g., FSSS 175) is capable of using the available spectral bandwidth in a colorless, directionless, contentionless, and gridless framework. Additionally, as previously described, the total number of optical channels in the transport system is not fixed, the data rate of each optical channel is not fixed, the number of optical carriers for each optical channel is not fixed, the central frequency of an optical channel is not adherent to a fixed frequency grid, and the bandwidth and the number of optical carriers of each optical channel may be dynamically adjusted based on network traffic demands, available resources, etc.

Figure 2:
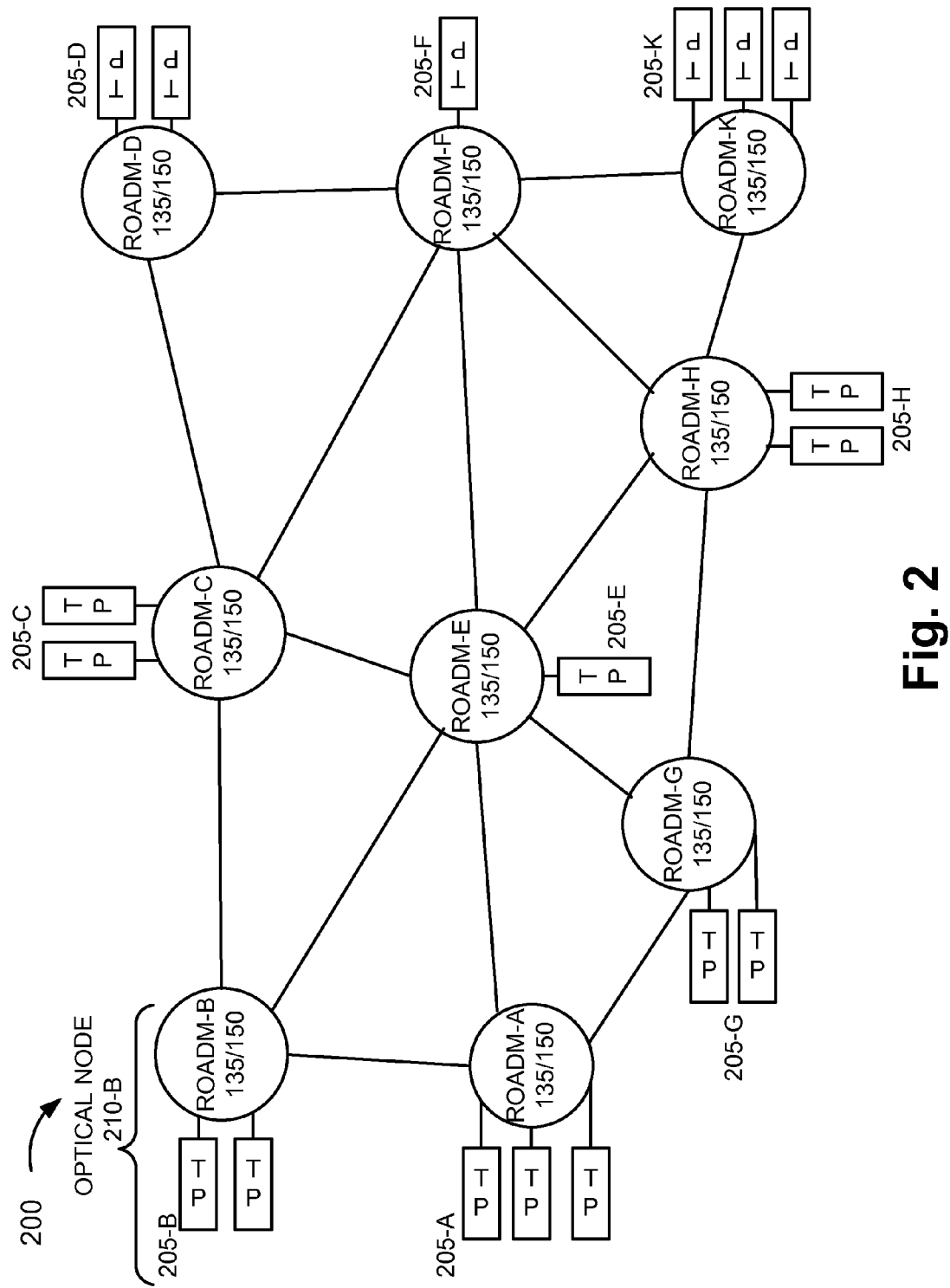
FIG. 2 is an exemplary optical network including add-drop multiplexers and transponders.

FIG. 2 is an exemplary optical network 200 including optical nodes 210-B through 210-K in which each optical node 210 includes ROADM 135/150 and transponders (TP) 205. Exemplary processes pertaining to an exemplary embodiment of a transport system is described in reference to FIGS. 2, 3, 4 and 5. The exemplary processes described in FIGS. 3, 4, and 5 may be performed reactively or proactively. By way of example, an exemplary process may be performed periodically or aperiodically, in response to a change in network topology (e.g., new light paths added to the optical network, additional optical nodes, etc), in response to a change in network state (e.g., available network resources, etc.), etc.

According to an exemplary embodiment, the exemplary processes may be performed by network management system 125. According to another embodiment, the exemplary processes may be performed by a combination of network management system 125 and network management module 127. According to yet another exemplary embodiment, the exemplary processes may be performed by network management module 127.

According to an exemplary embodiment, network management system 125 and/or network management 127 may perform a process based on one or multiple processors, microprocessors, multi-core processors, application specific integrated circuits (ASICs), controllers, microcontrollers, and/or some other type of hardware logic.

Figure 3:
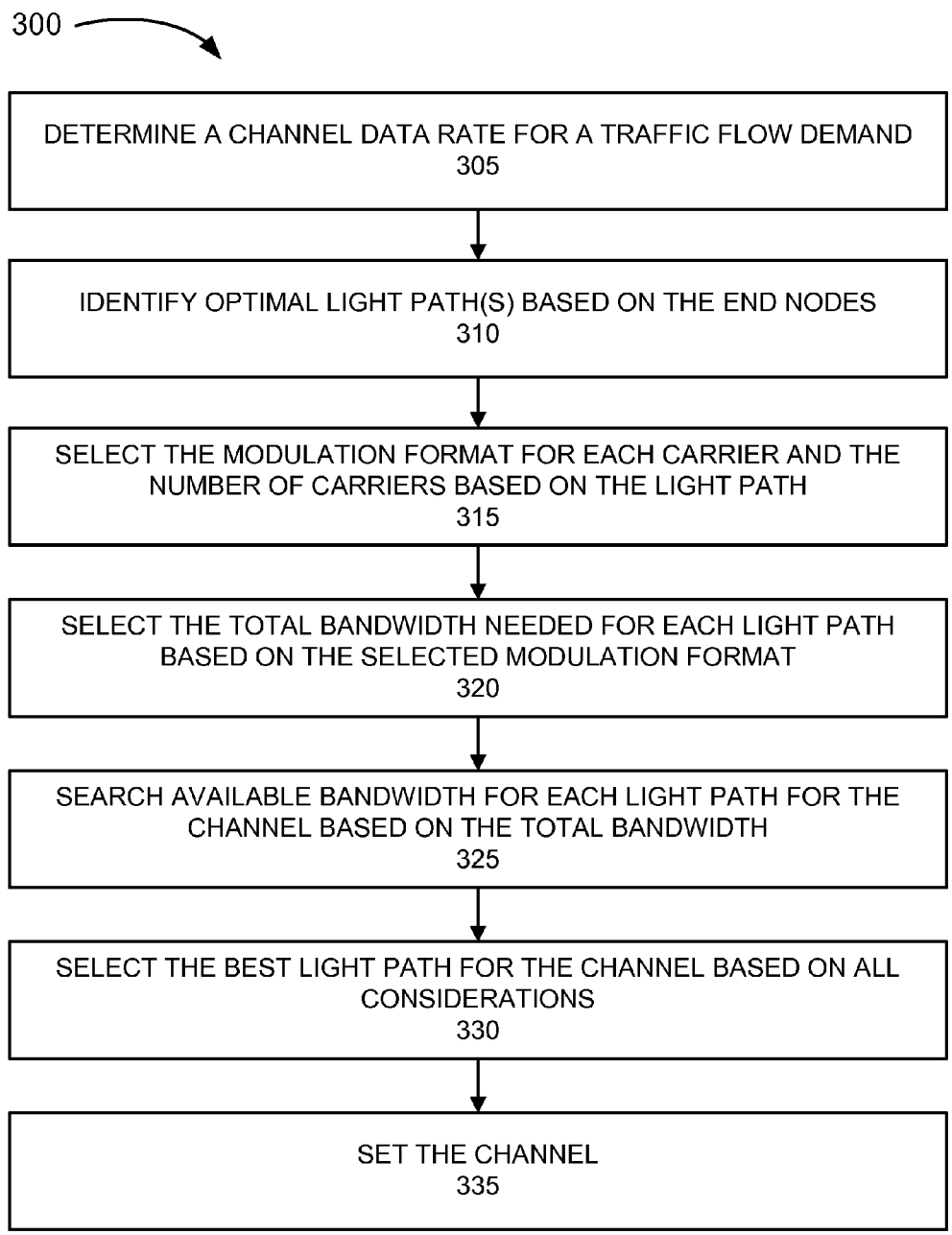
FIG. 3 is a flow diagram illustrating an exemplary process to set up an optical channel.

FIG. 3 is a flow diagram illustrating an exemplary process 300 to set up an optical channel.

In block 305, a channel data rate for a traffic flow demand is determined. For example, assume network management system 125 receives a traffic demand request. Referring to FIG. 2, according to an exemplary scenario, the traffic demand request includes a request for a 700 Gigabits/second (Gb/s) optical channel from optical node 210-B to optical node 210-K.

Referring back to FIG. 3, in block 310, optimal light paths(s) are identified based on the optical end nodes. For example, network management system 125 may identify candidate (shortest) light paths from optical node 210-B to optical node 210-K. Referring to FIG. 2, assume that optical node 110 identifies light path A-B-C-F-K; light path A-E-H-K; and light path A-G-H-K.

Referring back to FIG. 3, in block 315, the modulation format for each carrier and the number of carriers for each candidate light path is selected. For example, network management system 125 selects the modulation format based on the reach distance of each candidate light path. Network management system 125, in addition to, or instead of, may use other factors (e.g., available bandwidth, etc.) for selecting the modulation format. In this example, network management system 125 selects Dual Polarization Quadrature Phase Shift Keying (DP-QPSK) as the modulation format. Additionally, in this example, network management system 125 selects seven optical carriers in which each optical carrier is allocated 25 Gigahertz (GHz).

In block 320, the total bandwidth needed for each candidate light path based on the selected modulation format is determined. In this example, network management system 125 determines the total bandwidth as being 175 GHz (i.e., 25 GHz×7 optical carriers).

In block 325, the available bandwidth for each candidate light path for the optical channel is searched based on the total bandwidth. For example, network management system 125 searches the available bandwidth with respect to other nodes (e.g., optical nodes 210) along the candidate light paths based on the total bandwidth of 175 GHz. In this example, network management system 125 finds available bandwidth for light path A-B-C-F-K wide-open and for light path A-E-H-K available bandwidth between 192.320 THz to 193.200 THz. However, network management system 125 does not find 175 GHz of available bandwidth for light path A-G-H-K.

In block 330, a light path is selected from the candidate light path(s). For example, network management system 125 selects the best (e.g., optimal) light path from the candidate light paths A-B-C-F-K and A-E-H-K. In this example, network management system 125 selects light path A-E-H-K over light path A-B-C-F-K because light path A-E-H-K is a shorter distance. Additionally, or alternatively, network management system 125 may select a particular light path as the optimal light path based on other considerations, such as modulation format, available bandwidth, spectral efficiency, etc.

In block 335, the optical channel is set. For example, network management system 125 configures the optical channel along the selected light path A-E-H-K via network management module 127. The traffic demand request is then satisfied via the resources allocated.

Although FIG. 3 illustrates an exemplary process 300 for setting up an optical channel, according to other implementations, process 300 may include additional operations, fewer operations, and/or different operations than those illustrated in FIG. 3 and described.

Figure 4:
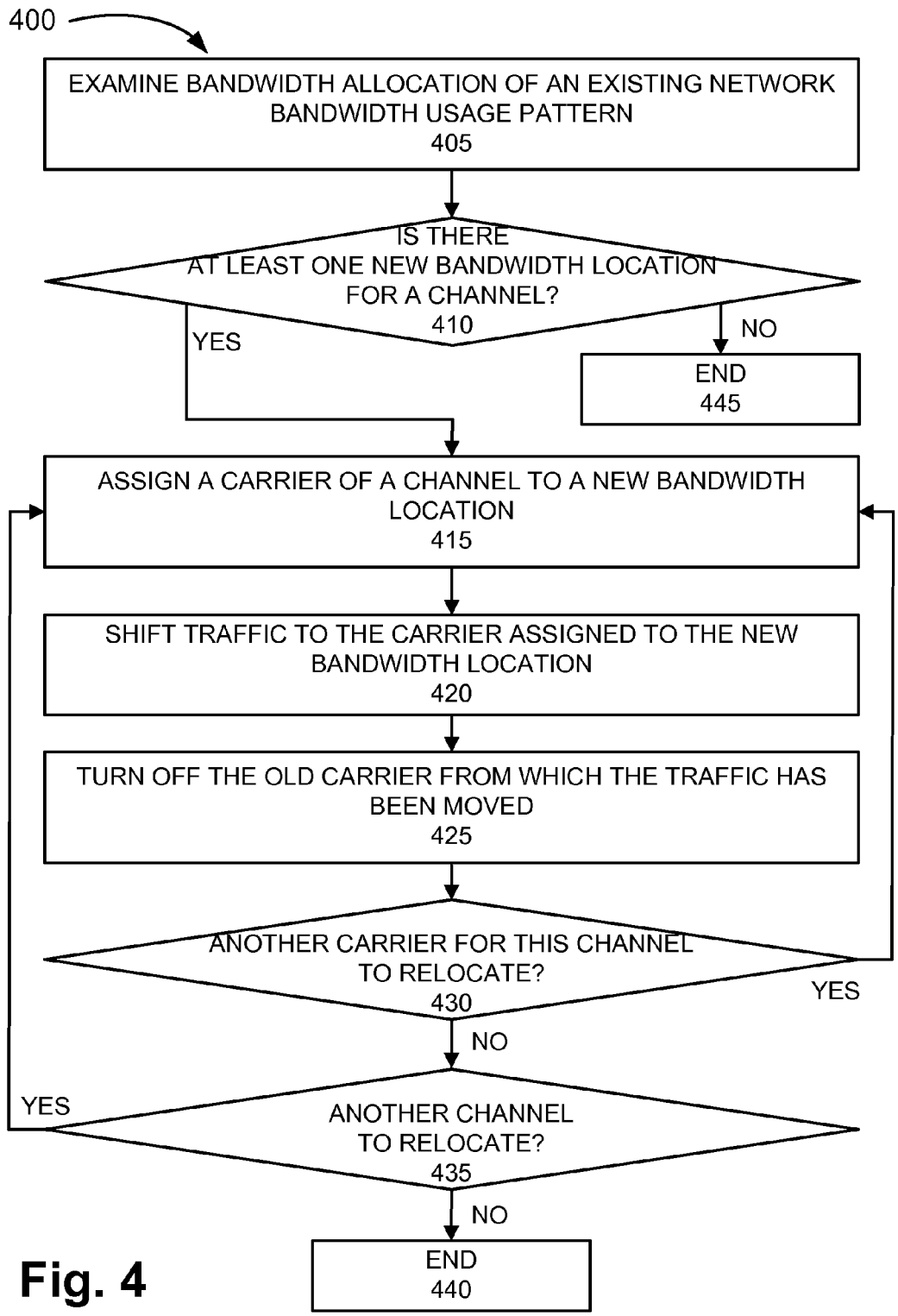
FIG. 4 is a flow diagram illustrating an exemplary process to defrag channel allocation to achieve optimal spectral usage.
Figure 6:
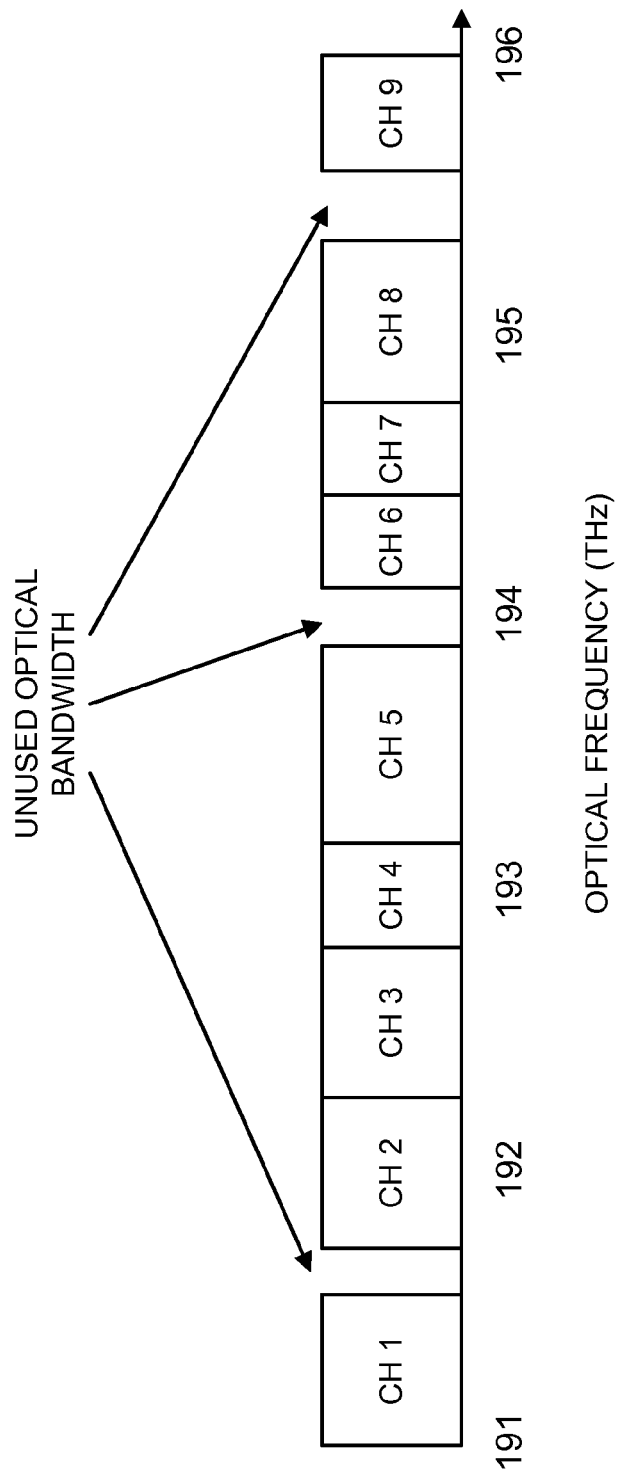
FIG. 6 is a diagram illustrating unused bandwidth between optical channels.

FIG. 4 is a flow diagram illustrating an exemplary process 400 to defrag channel allocation(s) to achieve optimal spectral usage. For example, assume that a new optical channel has to be added, but an existing optical bandwidth and channel allocation imprint pertaining to a light path does not provide sufficient contiguous bandwidth for the new optical channel. According to an exemplary embodiment, network management system 125 may defrag or rearrange optical channel allocation(s) to create sufficient contiguous bandwidth for the new optical channel. By way of example, assume that unused bandwidth exists between optical channels, as illustrated in FIG. 6.

In block 405, a bandwidth allocation of an existing network bandwidth usage pattern is examined. For example, network management system 125 identifies the existing bandwidth/channel allocation pertaining to a light path. For example, network management system 125 identifies the existing bandwidth/channel allocation for each optical node 210 along light path B-C-D. According to an exemplary embodiment, the examination of the bandwidth usage pattern pertains to the overall spectrum and on a per-channel basis. In this example, FIG. 6 may represent the bandwidth/channel allocation imprint for optical node 210-B. Optical node 210-C and optical node 210-D may have their own unique bandwidth/channel allocation imprint.

In block 410, it is determined whether at least one new bandwidth location for the optical channel is available. For example, based on the examination of bandwidth/channel allocation imprints pertaining to optical nodes 210-A-B-C, network management system 125 may identify whether there is sufficient available, unused bandwidth spectrum for the new optical channel based on shifting optical channel(s) to a new bandwidth location(s). Depending on, among other considerations, the amount of bandwidth needed for the new optical channel and the existing bandwidth/channel allocation imprints, network management system 125 may select an optical channel to be assigned to a new bandwidth location. Once an optical channel is selected, one or multiple carriers may be assigned to the new bandwidth location depending on the optical channel.

According to this example, it may be assumed that network management system 125 determines an optical channel may be assigned to a new bandwidth location. Thus, network management system 125 determines that there is a new bandwidth location for an optical channel (block 410-YES), and process 400 continues to block 415. According to another example, if network management system 125 determines, for example, that there is not sufficient available, unused bandwidth between optical nodes 210-A-B-C, process 400 may end (block 445). Alternatively, network management system 125 may select another light path to assign the new optical channel (e.g., light path B-E-F-C) and return to block 405.

In block 415, network management system 125 may assign (e.g., via network management module 127) an optical carrier of the selected optical channel to a new bandwidth location. In block 420, network management system 125 may shift traffic (e.g., via network management module 127) to the optical carrier assigned to the new bandwidth location. In block 425, network management system 125 may turn-off (e.g., via network management module 127) the optical carrier from which the traffic has been moved.

In block 430, network management system 125 may determine whether another optical carrier for this optical channel needs to be relocated. Depending on, among other things, the number of optical carriers associated with the optical channel, the amount of spectrum needed for the new optical channel, the bandwidth/channel allocation imprints, etc., network management system 125 may repeat blocks 415 through 425. If it is determined that another optical carrier for the optical channel is to be relocated (block 430-YES), process 400 continues to block 415. If it is determined that another carrier for the optical channel is not to be relocated (block 430), it is determined whether another optical channel is to be relocated (block 435). For example, depending on, among other things, the amount of spectrum needed for the new optical channel and the bandwidth/channel allocation imprints, network management system 125 may determine whether additional defragging is to be performed.

If it is determined that another optical channel is to be relocated (block 435-YES), process 400 continues to block 415. If it is determined that another optical channel is not to be relocated (e.g., sufficient contiguous, unused bandwidth does not exist nor can be created), process 400 ends (block 440).

Although FIG. 4 illustrates an exemplary process 400 for defragging channel allocation(s) to achieve optimal spectral usage, according to other implementations, process 400 may include additional operations, fewer operations, and/or different operations than those illustrated in FIG. 4 and described. For example, network management system 125 configures the new optical channel (via network management module 127) to the contiguous, unused bandwidth created by the defragging process.

Figure 5:
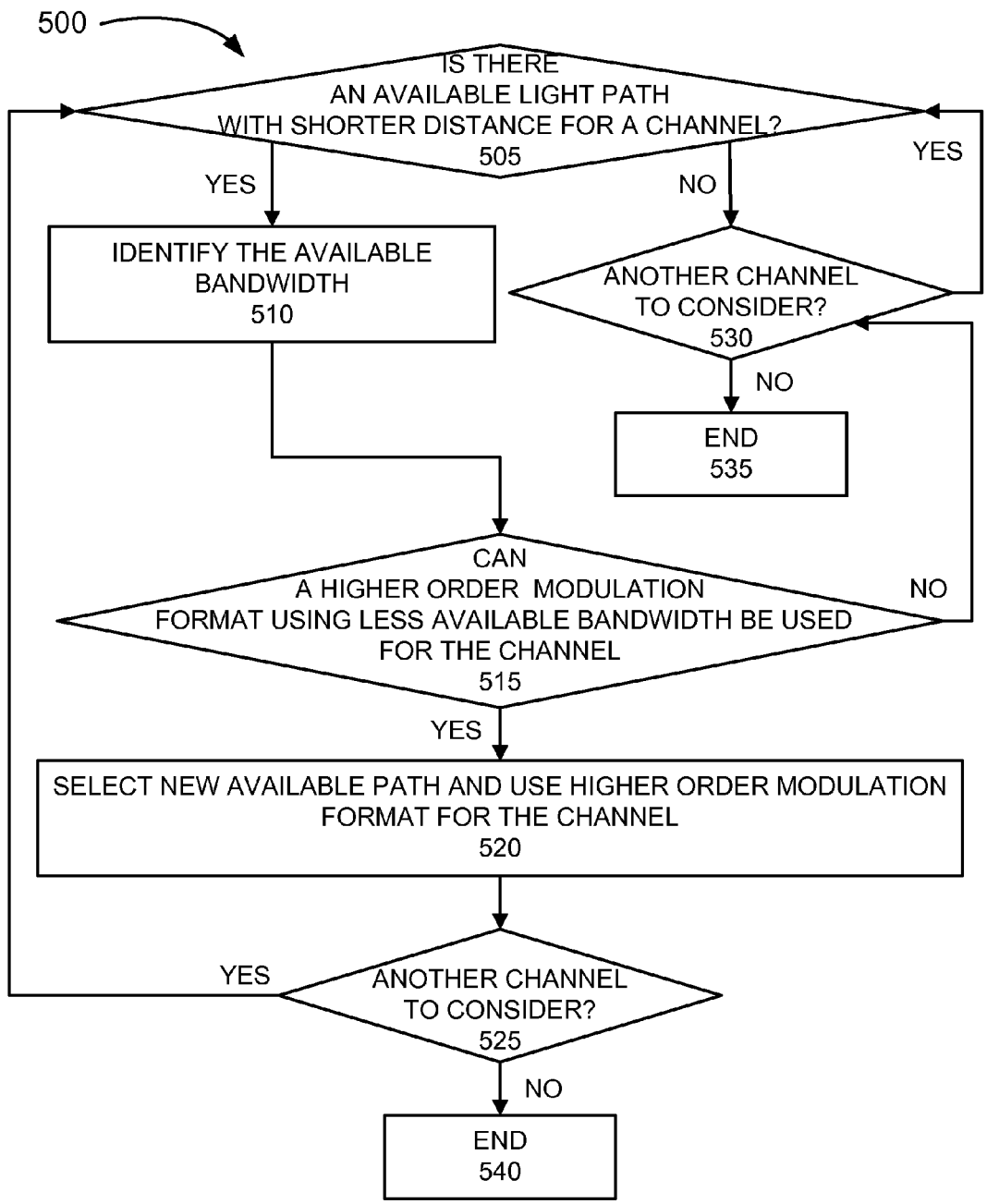
FIG. 5 is a flow diagram illustrating an exemplary process to set up an optical channel based on light path distance.

FIG. 5 is a flow diagram illustrating an exemplary process 500 to set up an optical channel based on light path distance. In block 505, network management system 125 may determine whether there is an available light path with a shorter distance for an optical channel. For example, network management system 125 may select a particular light path to determine whether there is an alternate, shorter light path for the selected optical channel. By way of example, referring to FIG. 2, assume that there is a 2-Tb/s channel via light path A-B-E-H-G in which DP-QPSK is used for each optical carrier and the total bandwidth used is 500 GHz. Subsequently, a new light path A-G is created.

If it is determined that there is an alternate, shorter light path for the selected optical channel (block 505-YES), the available bandwidth for the shorter light path is identified (block 510). For example, network management system 125 determines that light path A-G is shorter than light path A-B-E-H-G. Network management system 125 identifies the available bandwidth with respect to the light path A-G. In this example, network management system 125 identifies the available bandwidth is 300 GHz and process 500 continues to block 515.

If it is determined that there is not another, shorter light path for an optical channel (block 505-NO), it is determined whether there is another optical channel to consider (block 530). If there is another optical channel to consider (block 530-YES), process 500 continues to block 505. If there is not another optical channel to consider (block 530-NO), process 500 ends (block 535).

In block 515, it is determined whether a higher order modulation format using less available bandwidth (e.g., relative to the bandwidth allocated for the existing optical channel) for the optical channel may be used. For example, network management system 125 determines whether a higher order modulation format can be used in the available 300 GHz of light path A-G. In this example, network management system 125 determines that the Dual Polarization 16 Quadrature Amplitude Modulation (DP-16 QAM) modulation format may be used for light path A-G in which 250 GHz of optical bandwidth may be used to yield a 2-Tb/s channel.

As illustrated in FIG. 5, if it is determined that a higher order modulation format may not be used (block 515-NO), process 500 may continue to block 530. However, if it is determined that a higher order modulation format may be used (block 515-YES), the alternate, shorter light path using the higher order modulation format is selected for the optical channel (block 520). For example, network management system 125 configures (e.g., via network management module 127) the selected optical channel via the alternate, shorter light path A-G in which the optical bandwidth is 250 GHz using DP-16 QAM.

In block 525, it is determined whether there is another optical channel to consider. If there is another optical channel to consider (block 525-YES), process 500 continues to block 505. If there is not another optical channel to consider (block 525-NO), process 500 ends (block 540).

Although FIG. 5 illustrates an exemplary process 500 to set up an optical channel based on light path distance, according to other implementations, process 500 may include additional operations, fewer operations, and/or different operations than those illustrated in FIG. 5 and described.

The foregoing description of implementations provides illustration, but is not intended to be exhaustive or to limit the implementations to the precise form disclosed. Accordingly, modifications to the implementations described herein may be possible.

According to an exemplary embodiment described, an optical transport channel may no longer have fixed number with respect to the following parameters: the number of optical carriers, level of modulation formats of the optical carriers, total optical bandwidth of an optical channel, the central frequency of an optical channel, and a total number of optical channels in a optical transport system.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the processes illustrated in FIGS. 3-5, the order of the blocks may be modified in other implementations. Further, non-dependent blocks may be performed in parallel. Additionally, with respect to other processes described in this description, the order of operations may be different according to other implementations, and/or operations may be performed in parallel.

An embodiment described herein may be implemented in many different forms of software and/or firmware executed by hardware. For example, a process or a function may be implemented as "logic" or as a "component." The logic or the component may include, for example, hardware, a combination of hardware and software, a combination of hardware and firmware, or a combination of hardware, software, and firmware. By way of example, hardware may include a processor. The processor may include, for example, one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs) to interpret and/or execute instructions and/or data.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. An optical node comprising:
one or more transponders; and
a reconfigurable optical add-drop multiplexer (ROADM) that is directionless, colorless, contentionless, and gridless comprising:
flexible spectrum selective switches; and
add/drop ports, wherein the one or more transponders and the ROADM are configured to:
transmit, receive, and switch a non-fixed number of optical channels based on an optical network demand, wherein an optical bandwidth associated with each optical channel is non-fixed; and a network management module comprising:
a memory, wherein the memory stores instructions; and
a processor, wherein the processor executes the instructions to:
examine a bandwidth allocation of an optical spectrum;
identify whether another bandwidth location can be used to service one of the non-fixed number of optical channels based on whether an assignment of the one of the non-fixed optical channels to the other bandwidth location creates a contiguous amount of unused bandwidth that is greater than a contiguous amount of unused bandwidth if the one of the non-fixed optical channels is not assigned to the other bandwidth location;
assign one or more optical carriers belonging to the one of the non-fixed optical channels to the other bandwidth location in response to an identification that the other bandwidth location can be used to service the one of the non-fixed optical channels and the assignment creates the contiguous amount of unused bandwidth that is greater than the contiguous amount of unused bandwidth if the one of the non-fixed optical channels is not assigned to the other bandwidth location; and
shift optical network traffic to the one or more assigned optical carriers of the other bandwidth location.

2. The optical node of claim 1, further comprising:
power splitters; and
wherein the ROADM is configured to:
add or drop the non-fixed number of optical channels according to the non-fixed optical bandwidth associated with each optical channel.

3. The optical node of claim 1, wherein the optical channels are dense wavelength division multiplexing optical channels.

4. The optical node of claim 1,
wherein the processor further executes the instructions to:
configure the non-fixed number of optical channels via the one or more transponders and the ROADM, wherein a number of optical carriers for each optical channel and a data rate for each optical channel is adjusted dynamically based on the optical network demand.

5. The optical node of claim 1, wherein the
one or more transponders comprise:
a single-carrier transmitter or a multi-carrier transmitter; and
a single-carrier receiver or a multi-carrier receiver.

6. The optical node of claim 1, wherein the processor further executes the instructions to:
examine, identify, assign, and shift based on a proactive triggering event or a reactive triggering event.

7. The optical node of claim 1, wherein the one or more transponders are configured to:
set a data rate for each optical channel;
set a number of optical carriers for each optical channel;
set a modulation format for each optical carrier;
set a total bandwidth for each optical channel; and
set a starting frequency and an ending frequency for each optical channel based on instructions from a network management module.

8. The optical node of claim 1, wherein no channel spacing is used relative to at least two of the non-fixed number of optical channels.

9. An optical communication system comprising:
a transport system comprising optical nodes connected to optical fibers, wherein each optical node comprises:
a network management module;
one or more transponders;
a reconfigurable optical add-drop multiplexer (ROADM) that is directionless, colorless, contentionless, and gridless; and the transport system further comprising:
a network management system comprising:
a memory, wherein the memory stores instructions; and
a processor, wherein the processor executes the instructions to:
configure the one or more transponders and the ROADM of the optical nodes, via the network management module, to:
transmit, receive, and switch a non-fixed number of optical channels based on an optical network demand, wherein an optical bandwidth associated with each optical channel is non-fixed;
select one of the non-fixed optical channels;
determine whether there is another available light path that is shorter than an existing light path being used to support the one of the non-fixed optical channels;
identify an available bandwidth of the other available light path in response to a determination that there is the other available light path that is shorter;
determine whether a higher modulation format that uses less bandwidth relative to a modulation format and bandwidth being used along the existing light path can be used;
switch the one of the non-fixed optical channels to the other available light path in response to a determination that the higher modulation format that uses less bandwidth can be used; and
configure the one of the non-fixed optical channels based on the higher modulation format.

10. The optical communication system of claim 9, wherein the one or more transponders are configured to:
set a data rate for each optical channel;
set a number of optical carriers for each optical channel;
set a modulation format for each optical carrier;
set a total bandwidth for each optical channel; and
set a starting frequency and an ending frequency for each optical channel according to a gridless use of an optical spectrum.

11. The optical communication system of claim 9, wherein the ROADM comprises:
flexible spectrum selective switches; and
add/drop ports, wherein the flexible spectrum selective switches are configured to:
switch the non-fixed number of optical signals to the add/drop ports according to the non-fixed optical bandwidth associated with each optical channel.

12. The optical communication system of claim 9, wherein the ROADM comprises:
power splitters, and wherein no channel spacing is used relative to at least two of the non-fixed number of optical channels.

13. The optical communication system of claim 9, wherein the transport system includes a dense wavelength division multiplexing transport system.

14. The optical communication system of claim 9, wherein the
one or more transponders comprise:
a single-carrier transmitter or a multi-carrier transmitter; and
a single-carrier receiver or a multi-carrier receiver.

15. The optical communication system of claim 9, wherein optical spectrum to which the one of the non-fixed optical channels is switched does not provide channel spacing relative to the one of the non-fixed optical channels.

16. The optical communication system of claim 9, wherein the processor further executes the instructions to:
detect a topology change in an optical network to which the optical communication system belongs, and wherein, when determining whether there is another available light path, the processor further executes the instruction to:
determine whether there is another available light path that is shorter than the existing light path being used to support the one of the non-fixed optical channels in response to the detection of the topology change.

17. An optical communication system comprising:
optical nodes, wherein each optical node comprises:
a network management module;
one or more transponders; and
a reconfigurable optical add-drop multiplexer (ROADM) that is directionless, colorless, contentionless, and gridless comprising:
flexible spectrum selective switches; and
add/drop ports, wherein the one or more transponders and the ROADM are configured to:
transmit, receive, and switch a non-fixed number of optical channels based on an optical network demand, wherein an optical bandwidth associated with each optical channel is non-fixed, and the optical communication system further comprising
a network management system comprising:
a memory, wherein the memory stores instructions; and
a processor, wherein the processor executes the instructions to:
select one of the non-fixed optical channels;
determine whether there is another available light path that is shorter than an existing light path being used to support the one of the non-fixed optical channels;
identify an available bandwidth of the other available light path in response to a determination that there is the other available light path that is shorter;

determine whether a higher modulation format that uses less bandwidth relative to a modulation format and bandwidth being used along the existing light path can be used;
switch the one of the non-fixed optical channels to the other available light path in response to a determination that the higher modulation format that uses less bandwidth can be used;
configure the one of the non-fixed optical channels based on the higher modulation format; and
configure at least one of the network management modules of at least one of the optical nodes with a configuration of the one of the non-fixed optical channels.

18. The optical communication system of claim 17, wherein each optical node further comprises:
power splitters; and
wherein the ROADM is configured to:
add or drop the non-fixed number of optical channels according to the non-fixed optical bandwidth associated with each optical channel.

19. The optical communication system of claim 17, wherein the one or more transponders are configured to:
set a data rate for each optical channel;
set a number of optical carriers for each optical channel;
set a modulation format for each optical carrier;
set a total bandwidth for each optical channel; and
set a starting frequency and an ending frequency for each optical channel according to a gridless use of an optical spectrum.

20. The optical communication system of claim 17, wherein the processor further executes the instructions to:
detect a topology change in an optical network to which the optical communication system belongs, and wherein, when determining whether there is another available light path that is shorter, the processor further executes the instruction to:
determine whether there is another available light path that is shorter than the existing light path being used to support the one of the non-fixed optical channels in response to the detection of the topology change.

* * * * *